(No Model.)

C. W. VAN ETTEN.
TOE WEIGHT.

No. 425,474. Patented Apr. 15, 1890.

Witnesses
E. C. Wurdeman
R. W. Bishop.

By his Attorneys,
C. A. Snow & Co.

Inventor
Cornelius W. Van Etten.

UNITED STATES PATENT OFFICE.

CORNELIUS W. VAN ETTEN, OF WILLIAMSTON, MICHIGAN.

TOE-WEIGHT.

SPECIFICATION forming part of Letters Patent No. 425,474, dated April 15, 1890.

Application filed July 27, 1889. Serial No. 318,906. (No model.)

*To all whom it may concern:*

Be it known that I, CORNELIUS W. VAN ETTEN, a citizen of the United States, residing at Williamston, in the county of Ingham and State of Michigan, have invented a new and useful Toe-Weight, of which the following is a specification.

My invention relates to improvements in toe-weights; and it consists in certain novel features, hereinafter described and claimed.

Figure 1:
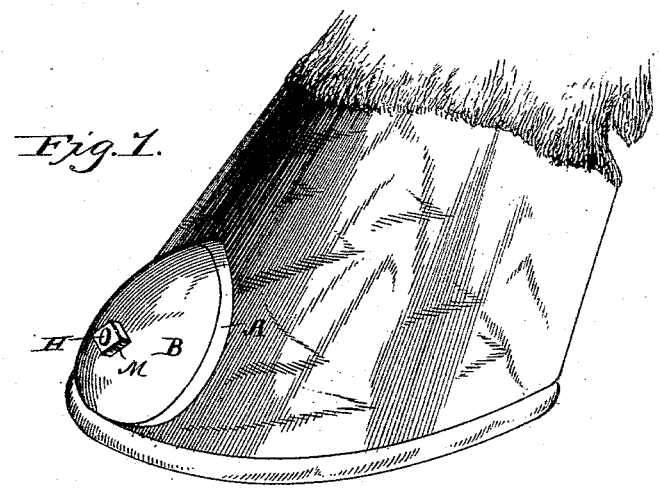
Figure 2:
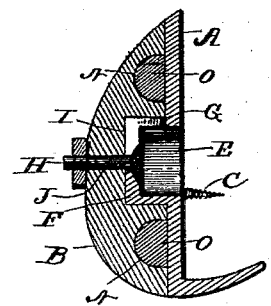
Figure 3:
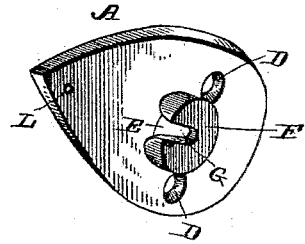
Figure 4:
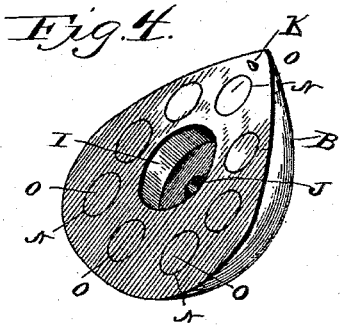

In the accompanying drawings, Figure 1 is a perspective view showing a hoof with my improved toe-weight applied thereto. Fig. 2 is a sectional view of the weight detached. Fig. 3 is a detail perspective view of the inner member, and Fig. 4 is a detail perspective view of the outer member.

My improved toe-weight is constructed in two members A B, which are detachably secured together, and which when together present the usual pear-shaped form of the ordinary weight. The inner member A is secured permanently to the hoof by means of the screws C, passed through openings D into the hoof, and it is provided at about its center with the opening E, and on its outer side with a lug F, surrounding said opening and having a notch G in its edge, as shown. A securing-screw H rests in this notch with its head fitting behind the lug, as clearly shown. The outer member B is provided in its inner side, at its center, with a recess I, which receives the lug F. An opening J extends through the said outer member from the center of the recess, as shown. The said member B is provided with the pin K on its inner side, which engages a recess L in the outer side of the inner member A, and thereby aids in securing the two members together. In securing the members together the securing-screw H is slipped into position within the lug G, and the outer member is then placed against the inner member with the said screw H passing through the opening J and the pin K engaging the recess L. A nut M is then mounted on the end of the securing-screw and turned up against the outer member, so as to clamp the two members together. The outer member is provided in its inner side with a series of recesses N, in which weights O are removably fitted. By means of this construction I am enabled to adjust the toe-weight so that it may be lighter or heavier, as may be desired, by removing some of the weights O, or adding additional weights, as will be readily understood.

From the foregoing description, taken in connection with the accompanying drawings, it will be seen that I have provided a toe-weight which is extremely simple in its construction, and by the use of which I overcome the necessity of employing a number of toe-weights of different degrees of heaviness, and which can be quickly and easily manipulated to have the desired weight. The outer member can be readily detached from the inner member, and if the securing-screw should be bent or broken it can be quickly removed by simply lifting it from the notched lug on the inner member, as will be readily understood.

The advantages of my device are thought to be obvious from the foregoing description, and further detailed reference thereto is deemed unnecessary.

Having described my invention, what I claim, and desire to secure by Letters Patent, is—

1. In a toe-weight of the character described, the outer member provided with a series of recesses in its inner side and a series of weights removably fitted in said recesses, as set forth.

2. The toe-weight comprising two members detachably connected, the inner member consisting of a plate provided with screw-holes, whereby it is adapted for permanent application to a hoof, and a central opening, and upon its front face provided with a lug radially slotted and arranged over the central opening, and the remaining member consisting of a weight having its rear face recessed to fit the lug and a transverse opening, and a screw inserted through the opening and having its head removably mounted in the central opening of the plate in rear of the lug and its neck resting in the radial slot in the lug, substantially as specified.

3. A toe-weight consisting, essentially, of two members fitted detachably together, the inner member being rigidly secured to the hoof and the outer member having a series of weight-receiving recesses, the mouths of said recesses facing the inner member, so that the latter holds the weights in place, as set forth.

4. A toe-weight consisting, essentially, of two members, the inner member being rigidly and permanently secured to the hoof, while the outer member is provided with a series of weight-receiving recesses, and a screw removably fitted to the inner member and passing through the outer member and secured by a nut, as set forth.

In testimony that I claim the foregoing as my own I have hereto affixed my signature in presence of two witnesses.

CORNELIUS W. VAN ETTEN.

Witnesses:
W. A. STEELE,
H. M. BIGELOW.